(12) United States Patent
Trull et al.

(10) Patent No.: US 6,718,647 B2
(45) Date of Patent: Apr. 13, 2004

(54) FORCE SENSING PROBE

(75) Inventors: Stephen James Trull, Wickwar (GB); Geoff McFarland, Dursley (GB); Andrew Daniel Huber, Bartlett, IL (US); Peter George Lloyd, Bristol (GB)

(73) Assignee: Renishaw PLC, Gloucestershire (GB)

(*) Notice: Subject to any disclaimer, the term of this patent is extended or adjusted under 35 U.S.C. 154(b) by 0 days.

(21) Appl. No.: 10/049,716

(22) PCT Filed: Jun. 15, 2001

(86) PCT No.: PCT/GB01/02627
§ 371 (c)(1),
(2), (4) Date: Feb. 14, 2002

(87) PCT Pub. No.: WO01/96809
PCT Pub. Date: Dec. 20, 2001

(65) Prior Publication Data
US 2002/0104227 A1 Aug. 8, 2002

(30) Foreign Application Priority Data
Jun. 14, 2000 (GB) .............................. 0014651
Sep. 28, 2000 (GB) .............................. 0023764

(51) Int. Cl.⁷ .......................................... G01B 5/008
(52) U.S. Cl. .................................. 33/558; 33/704
(58) Field of Search .................. 33/558, 703, 704, 33/556, 557, 559, 560, 561, DIG. 2, DIG. 13

(56) References Cited

U.S. PATENT DOCUMENTS

| 4,473,955 | A | * | 10/1984 | McMurtry | 33/561 |
|---|---|---|---|---|---|
| 4,817,362 | A | | 4/1989 | Archer | |
| 5,119,568 | A | * | 6/1992 | Vesco et al. | 33/559 |
| 5,174,039 | A | * | 12/1992 | Murai | 33/556 |
| 5,345,689 | A | * | 9/1994 | McMurtry et al. | 33/559 |
| 5,396,712 | A | * | 3/1995 | Herzog | 33/503 |
| 5,471,406 | A | * | 11/1995 | Breyer et al. | 33/503 |
| 5,505,005 | A | * | 4/1996 | McMurtry et al. | 33/561 |
| 5,611,147 | A | | 3/1997 | Raab | 33/503 |
| 5,724,745 | A | | 3/1998 | Brenner et al. | 33/503 |
| 6,151,789 | A | * | 11/2000 | Raab et al. | 33/503 |
| 6,430,833 | B1 | | 8/2002 | Butter et al. | 33/559 |

FOREIGN PATENT DOCUMENTS

| EP | 0 426 492 A2 | 5/1991 | |
|---|---|---|---|
| GB | 2223586 A | * 4/1990 | G01B/3/10 |
| WO | WO 92/21932 | 12/1992 | |

* cited by examiner

Primary Examiner—Christopher W. Fulton
(74) Attorney, Agent, or Firm—Oliff & Berridge, PLC (57) ABSTRACT

A measurement probe (10) is disclosed having strain sensing elements (36) mounted on spokes (38) of a strain sensing member (34). The member (34) is disposed in parallel and spaced from a diaphragm (42). Inner portions of the member and diaphragm are connected to a stylus holder (26) and outer portions of the member and diaphragm are connected to probe body (32). The probe can be used to produce a signal when contact force on the stylus (12) is within an adjustable upper and lower limit, and is thereby suited to use with a manually manipulatable coordinate measuring device.

22 Claims, 7 Drawing Sheets

FORCE SENSING PROBE

The present invention relates to a force sensing probe of the type used with coordinate measuring machines (CMMs) and the like. Particularly but not exclusively the invention relates to the determination of the force exerted on a probe stylus when it is urged against a workpiece. Also the invention relates to improvements in the construction of such probes.

Profile measurement or scanning probes have generally an analogue output which increases as the deflection of the probe stylus increases and which is added or subtracted to or from known measurement machine readings. In this way an unknown profile can be followed and multiple machine readings can be used (adjusted by the probe stylus deviation) to determine the shape of the unknown profile. Analogue probes can be expensive.

A so-called hard probe, without sensing, can be used to make contact with a workpiece. Measurement of dimensions at the point of contact can be made by noting a machine's reading with no significant deflection of the stylus. A refinement of this probe allows the contact forces between the stylus and the workpiece to be measured i.e. a so-called force sensing probe. A probe of this type is outlined in U.S. Pat. No. 5,611,147 (Faro) at column 16 lines 3–28 and FIG. 26G.

Figure 1:
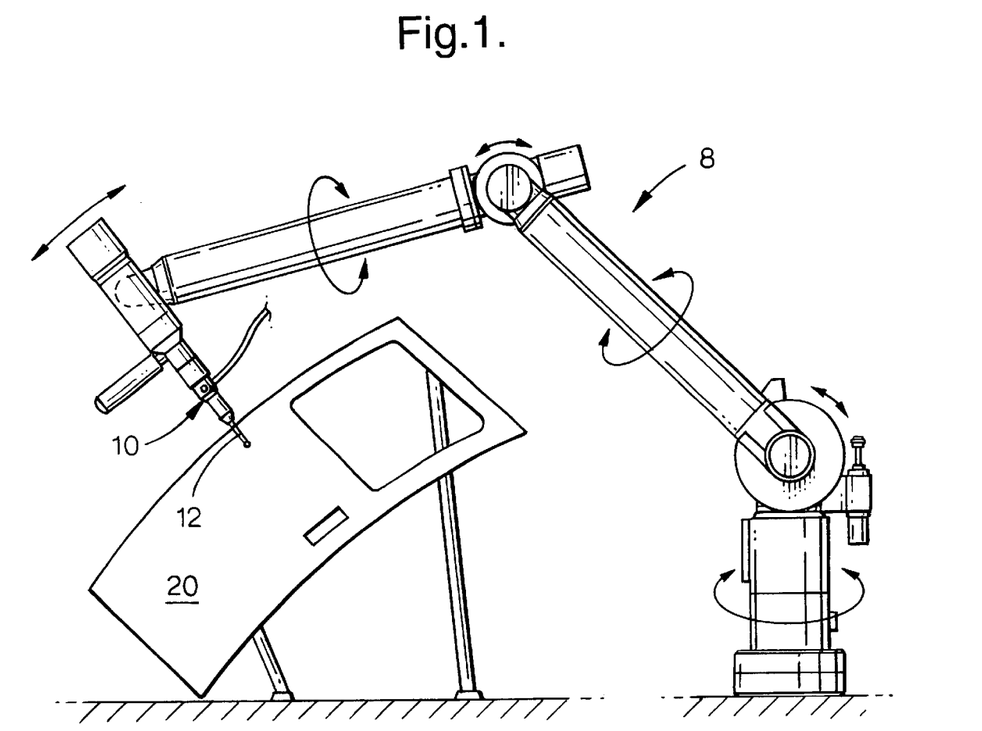
FIG. 1 shows a probe according to the invention attached to an articulatable arm.

Referring to FIG. 1 of the present drawings there is shown an articulatable arm 8 having various articulatable elements which are intended to be manually manipulatable in the direction shown by the arrows. A detailed explanation of this arm is provided in U.S. Pat. No. 5,611,147 which is incorporated herein by reference.

In use the arm's position is monitored by a system which determines the position of the stylus by monitoring the relative positions of all the articulatable elements. Measurements can be taken when the stylus is in contact with a workpiece to be measured (in this illustration a door 20).

Conventionally an operator touches the stylus against the workpiece and presses a button to take a stylus position reading. U.S. Pat. No. 5,611,147 at column 16 lines 3–28 and FIG. 26G describes a force sensing probe which automatically produces a "take a reading" signal when sufficient contact force is exerted on the stylus.

Few probe constructional details are disclosed in U.S. Pat. No. 5,611,147.

According to one aspect the present invention provides a measurement probe comprising as stylus holder, a probe body and a force transmitting member connecting the holder to the body, the member having strain sensing elements associated therewith for measuring the strain exerted on the member, characterised in that the probe comprises a diaphragm in spaced parallel relationship with the member, further connecting the holder to the body.

Preferably the holder has a portion of reduced stiffness at or adjacent the member.

Preferably the diaphragm is planar. Preferably the member has three strain sensing elements arranged at 120° intervals about a central region of the member. More preferably the intervals are formed by three spokes. Possibly a fourth reference element is provided mounted to a part of the member which is unstrained in use.

Alternatively the member may have six strain sensing elements. These elements may be arranged as two sets of three elements, each element of each set being positioned about a central region of the member and may be separated by an interval of approximately 120°. One set of elements may be positioned on three spokes extending radially from the central region.

U.S. Pat. No. 5,724,725 (Zeiss) describes a method of manually measuring a workpiece wherein only those measurements which fall within a range of stylus contact forces are validated. The forces are measured by monitoring deflections of various parts of the probe supporting structure but the forces within the probe itself are not measured. The system described in U.S. Pat. No. 5,724,745 may not determine accurately the contact forces on the stylus if any part other than handle (19 FIG. 1) is used to push the stylus (12) onto a workpiece.

According to a second independent aspect the invention provides a measurement probe to which a stylus is connectable for use with a coordinate determination device for determining the coordinates of points on a workpiece when contacted by the stylus, the probe comprising a stylus contact force sensing arrangement in use having a first state for allowing coordinate determination by the device and a second state for preventing coordinate determination by the device, characterised in that the first state occurs when contact force on the stylus is within a force range having an upper and lower limit and the second state occurs when contact force on the stylus is outside the force range.

Thereby the second state may occur when the contact force is either above the upper limit or below the lower limit of the force range.

Preferably the force sensing arrangement is disposed substantially within the probe.

Preferably the upper and lower limits are independently selectively adjustable.

The occurrence of the first or second states may be accompanied by an indication at the probe. More preferably the indication is the illumination of a light or the operation of an audible device. A different indication may be given for each of the first and second states.

According to a third independent aspect the invention provides a measurement probe comprising a force sensing member and a housing surrounding the member, a cover surrounding at least the portion of the housing that surrounds the member, the cover having a handgrip portion, the housing and the cover being separated.

Preferably the separation is an air gap, providing thermal insulation and protection of the member from manual force influences.

Preferably the handgrip portion comprises grooves in the cover and elastomeric rings disposed in the grooves.

An embodiment of the invention will be described with reference to the drawings in which.

Referring again to FIG. 1 a force sensing probe 10 according to the invention is shown attached to the known arm 8. A stylus 12 is shown attached to the probe. This is one example of use of the probe of the invention.

The probe of the invention might be attached to other hand operated CMMs or might be attached to a motor driven CMM, or a machine tool having a coordinate measuring ability.

Figure 2:
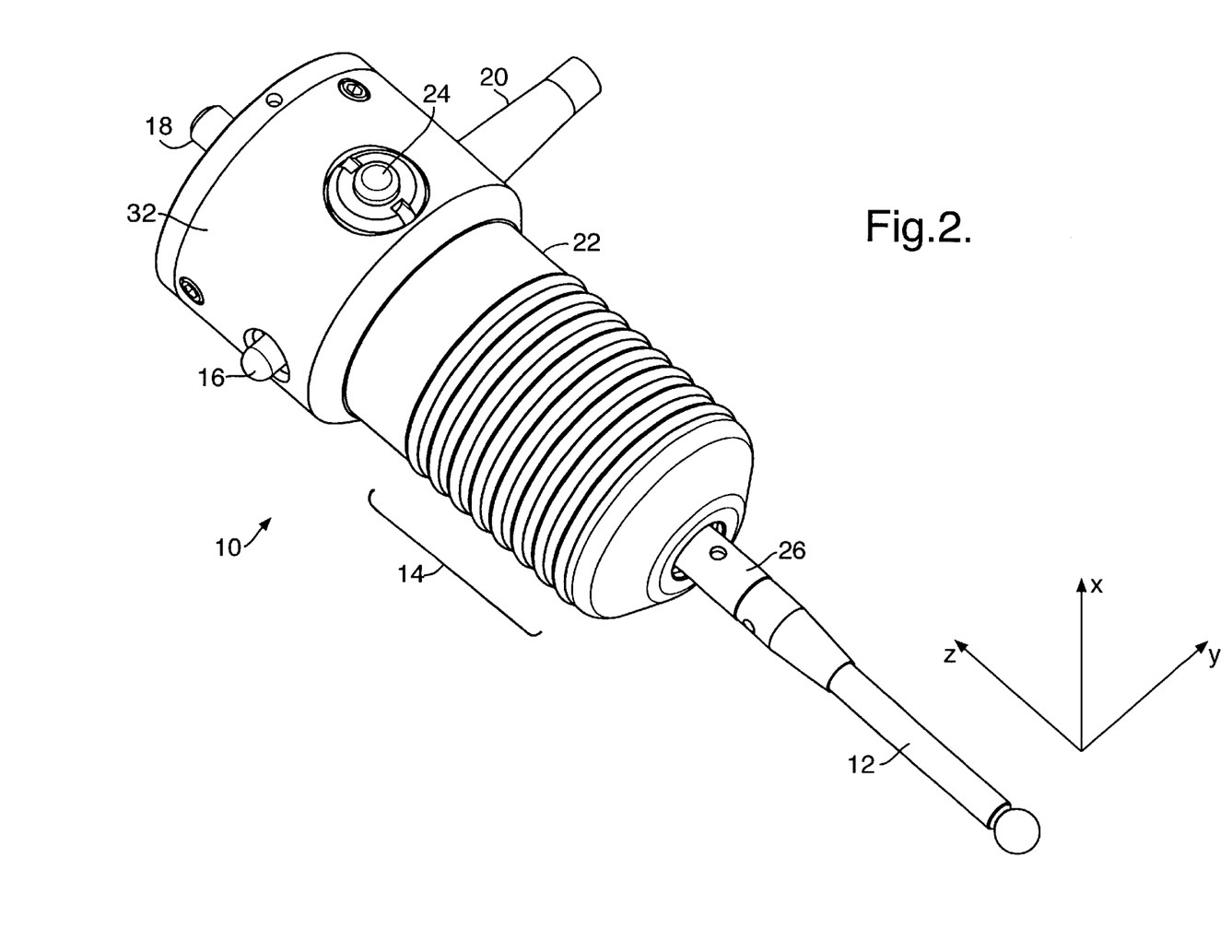
FIG. 2 shows a perspective view of a probe according to a first embodiment of the invention.
Figures 3, 4:
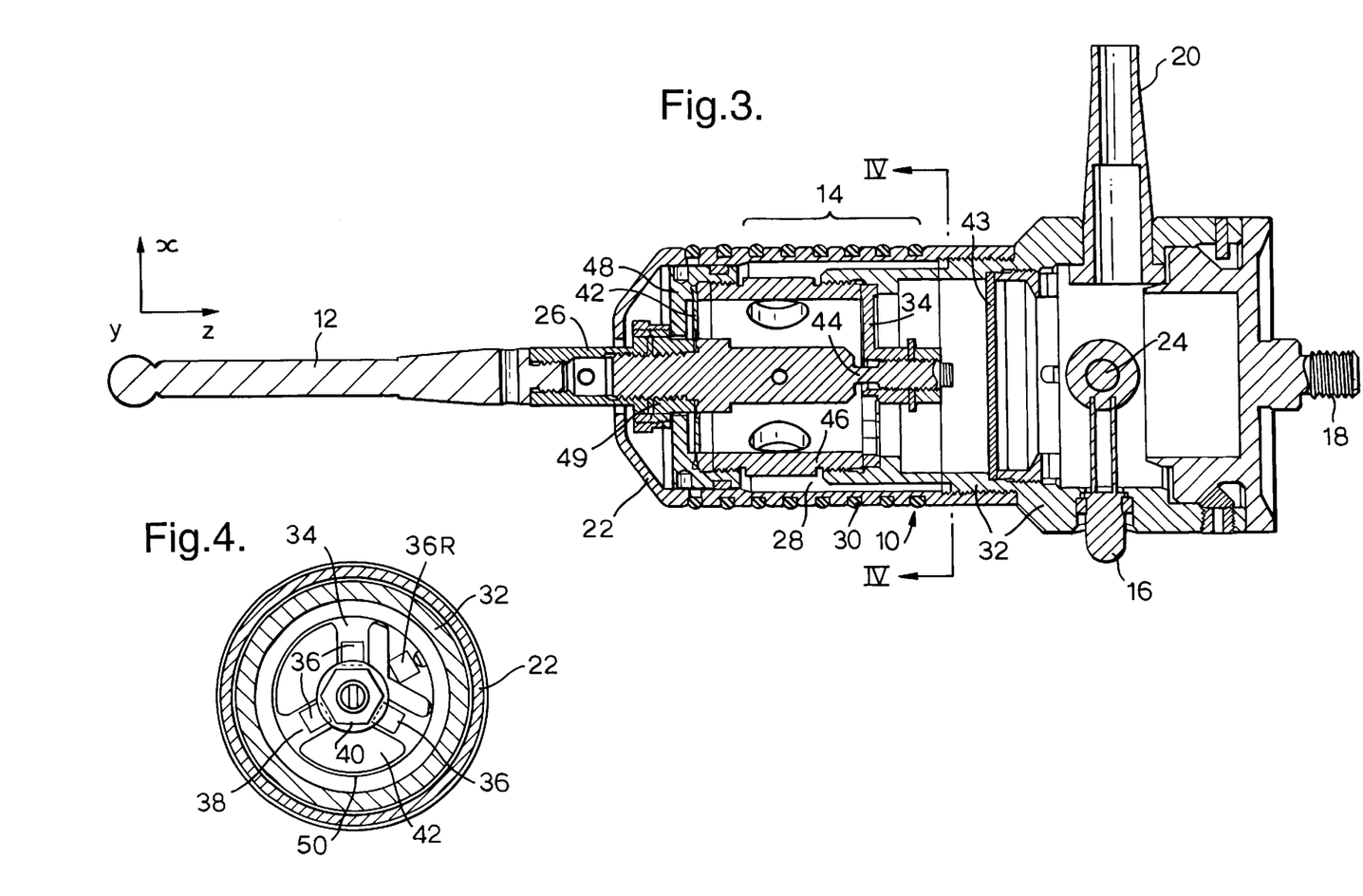
FIG. 3 shows a cross-section through the probe shown in FIG. 2.
FIG. 4 shows a cross-section through line IV—IV in FIG. 3.

Referring now to FIGS. 2 and 3, FIG. 2 shows a perspective view of the first embodiment of the probe 10, and stylus 12. The probe is connected to a CMM via a threaded spigot 18. A handgrip portion 14 is shown comprising grooves in an outer cover 22 and elastomeric rings 30, FIG. 3 in the grooves. A contact force indicator LED 16 is mounted in housing 32. A stylus holder 26 may be urged in X,Y and Z directions and transmits stylus contact forces into the probe. Output signals are produced in the probe and fed to the CMM (possibly via an interface) via wires which exit the probe at sleeve 20. The output signal might be transmitted wirelessly of course. A zero reset button 24 is provided on the housing.

FIG. 3 shows a cross-sectional elevation through the centre of the probe 10 illustrated in FIG. 2 and shows the constituent parts of this probe in more detail. The stylus holder 26 extends into the probe along a central axis A and is connected to the housing by means of a connecting member 34 and a diaphragm 42. The diaphragm 42 and member 34 are held in parallel. At their peripheries the diaphragm and member are clamped to the housing 32 by means of threaded parts 46 and 48. The strains in the member 34 are measured in use and converted into output signals. The diaphragm 42 is made from planar sheet material for example stainless steel, and is clamped to the holder 26 by means of a threaded clamping element 49. Alternatively it may be fixed with adhesive. The member 34 is connected to the holder 26. The member may be thicker than the diaphragm 42 and may be a machined part, possibly made from aluminium and having strain sensing elements (36, FIG. 4) mounted thereon. In this embodiment these elements are strain gauges 36. However they may be any strain sensing devices, for example, piezoelectric, optical or capacitance devices.

Forces exerted on the stylus 12 in the X,Y or Z directions are transmitted through the stylus holder 26, through the diaphragm and member 34,42 and into the housing 32. In manual usage the forces reactive to the contact forces will be provided at the handgrip portion 14 of cover 22 on the housing 32.

The contact forces will cause deflections in the member 34 and diaphragm 42. These deflections can be measured by the strain gauges 36 and converted into an output signal. A circuit board 43 carries the components necessary for strain gauge signal output.

Contact forces in the X or Y directions will cause pivoting of the holder 26 about a point substantially on the central axis between the diaphragm 42 and the member 34. A portion of reduced stiffness, in this case a necked portion 44 of the holder 26 is visible in FIG. 3. This necked portion is dimensioned to bend to prevent pivoting deflection of the holder being transmitted into the member 34, and thus to control the amount of bending moment exerted on the member 34. Instead, the pivoting deflection is taken up by bending of the necked portion and the member 34 is urged substantially perpendicularly to the central axis A when contact forces are produced in the X/Y directions. Contact forces in the Z direction will urge the holder along the central axis so no bending moments will be induced in the necked portion 44 when such forces are present.

Referring to FIG. 4 the shape of the member 34 is visible. Three spokes 38 radiate from a central portion 40 to a peripheral portion 50. A strain gauge 36 is mounted on each of the spokes, and a further strain gauge 36R is mounted at an unstressed point on the peripheral portion 50. The further strain gauge 36R is a reference gauge for temperature compensation.

The configuration of the diaphragm 42, the member 34, and the holder 26 and the relative strengths of these elements provides strain gauge output deviations which are substantially equal when a force is applied in the X,Y or Z directions. So, irrespective of direction, the force applied to the stylus will produce a similar output at the strain gauges.

The output from the strain gauges can be processed by known techniques. Our U.S. Pat. No. 4,817,362 describes in detail one possible technique for providing a signal output from three strain gauges. The circuitry disclosed provides a trigger signal when force is applied in either X,Y or Z directions above a threshold level.

For this embodiment the circuitry described in U.S. Pat. No. 4,817,362 can be modified slightly to provide more than one signal. The trigger signal can be produced when stylus contact forces are above a threshold, and turned off when a contact force exceeds a second threshold higher than the first threshold. A window comparator may be used to produce the trigger signal at a predetermined voltage of the varying voltage output of the strain gauge circuitry, and to discontinue the signal when the voltage exceeds a certain value.

Figure 5:
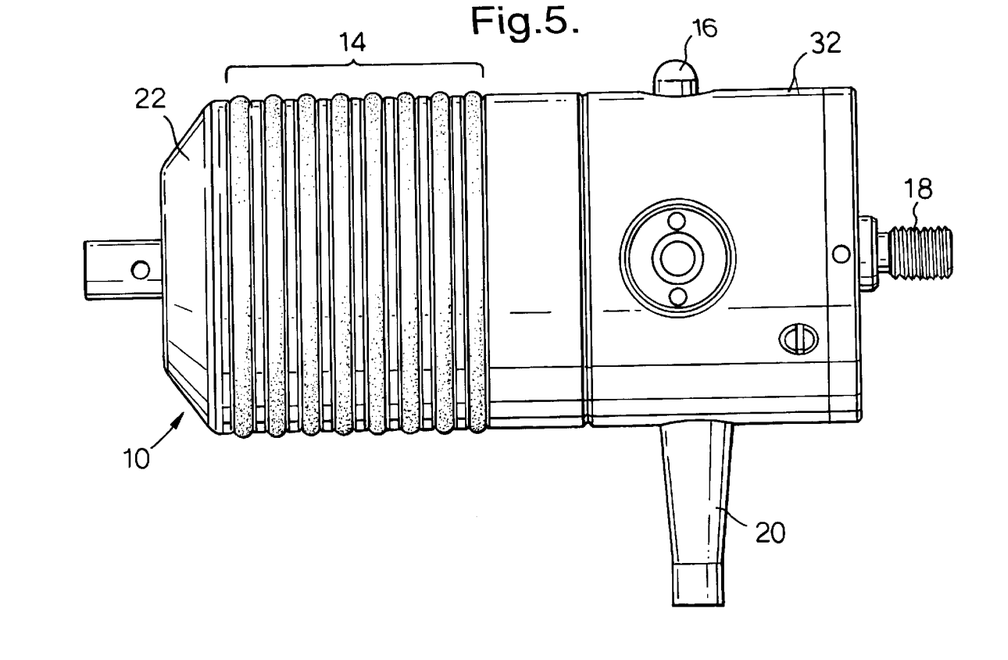
FIG. 5 shows a side view of another probe according to a second embodiment of the invention.
Figure 6:
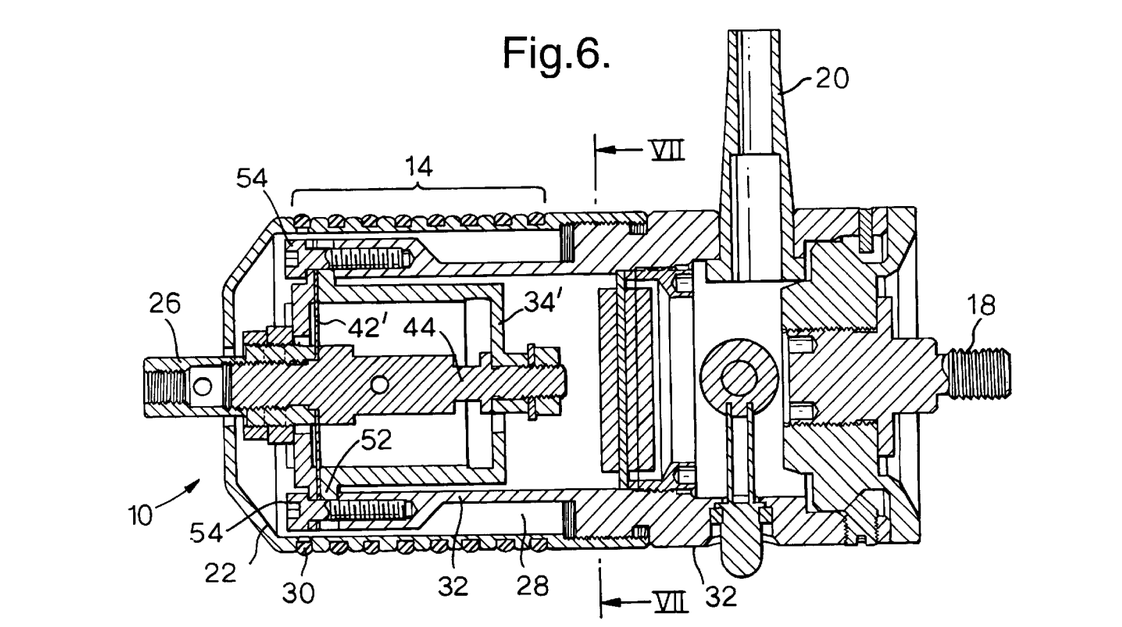
FIG. 6 shows a sectional view of the probe shown in FIG. 5.
Figure 7:
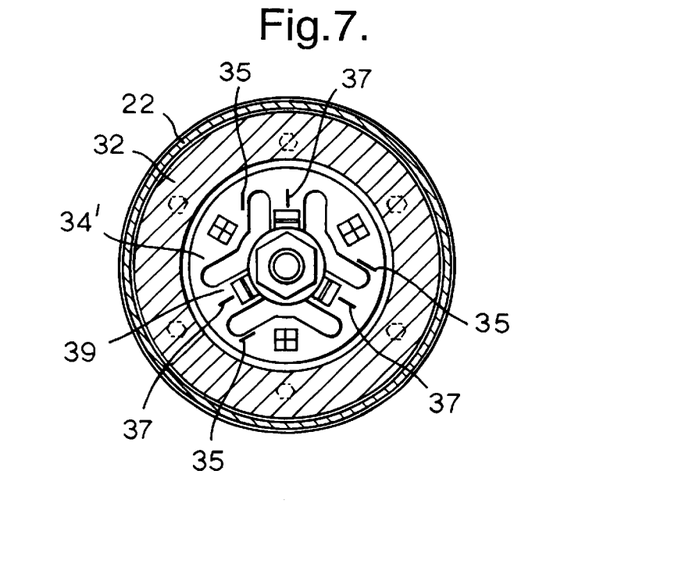
FIG. 7 shows a sectional view along the line VII—VII in FIG. 6.

A second embodiment of the invention is shown in FIGS. 5,6 and 7. The second embodiment is similar to the first and like numerals are used to denote like parts. Whilst many of the features are common to the first and second embodiments, in the second embodiment the arrangement of the member 34' and diaphragm 42' is different to that of the first embodiment.

The member 34' has also, in this second embodiment, a different arrangement of strain sensing elements (strain gauges in this instance).

The member 34' is formed as a "top hat" shape, having a "rim" portion 52 clamped to the housing 32 together with the diaphragm 42'. Screws 54 hold the member 34' and diaphragm 42' to the housing 32.

The arrangement of strain gauges on the member 34' is shown in FIG. 7. Three legs in the form of radially extending spokes 39 carry three strain gauges 37 and a further three gauges 35 are mounted to the member 34' at the positions shown.

In use gauges 35 are used to provide signal inputs, which by their position on the member 34', are sensitive to x and y directional forces, i.e. bending of the stylus. The three strain gauges 37 on the spokes 38 are connected in series and are sensitive to z direction stylus forces because the series connection tends to increase the overall signal when each gauge is strained in the same direction, i.e. all tension or all compression, resulting from z direction forces only.

In this manner the probe becomes equally sensitive to x,y and z forces exerted on the stylus.

As with the first embodiment the circuit shown in U.S. Pat. No. 4,817,362 can be utilised. The gauges 37 can provide the three signal inputs for the circuit and in place of the one reference gauge shown in that document, the three gauges 35 connected in a series can be used. The reference signal is used to provide z sensitivity. Any significant variation in the signal from the gauges 35 will become apparent when differential amplification takes place with respect to the signals from the gauges 37.

Whilst three gauges have been described and illustrated in FIG. 4 and six gauges have been described and illustrated in FIG. 7, any number of gauges can be used.

Figure 8:
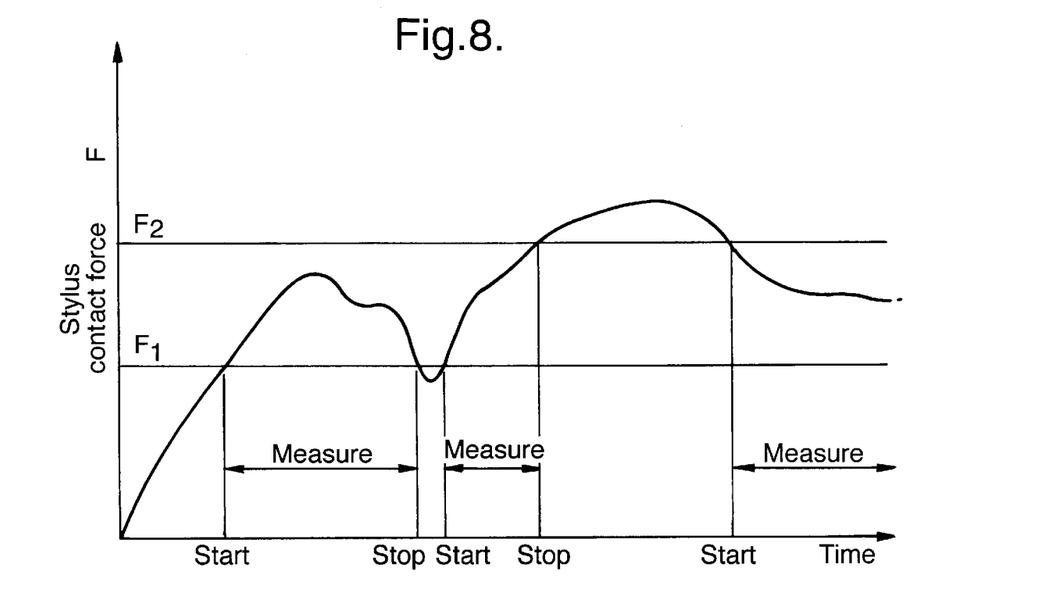
FIG. 8 shows a graphical representation of the signal outputs of the probes in FIGS. 1 to 7.

As described previously the circuit shown in U.S. Pat. No. 4,817,362 can be modified to provide a signal only when force exerted on the stylus is within a range having independently adjustable upper and lower limits. FIG. 8 shows the relationship between stylus contact force F (as measured by the strain gauges) and the signal produced by the probe. Typically such forces F will be applied to the stylus by an operator when manually manipulating the probe across the surface of a workpiece, and so will follow no definable path. A trigger signal is produced when a contact force $F_1$ has been reached or exceeded. When the contact force $F_2$, higher than $F_1$, has been reached the signal is stopped.

Using a suitable interface the signals can be changed to instructions for a CMM to "start" and "stop" stylus position readings i.e. start when $F_2>F>F_1$, stop when $F>F_2$ or $F<F_1$.

The interface may produce one or a series of pulses during the period when the contact force at the stylus is within a predefined range $F_1$–$F_2$. A series of pulses will allow use with so-called "edge sensitive" CMMs i.e. those that require a signal each time a measurement reading is taken. So-called "level sensitive" CMM controllers merely require a constant signal to take a predefined or selectable number of measurements whilst the signal exists.

Probe circuitry may provide a selectable output for edge sensitive or level sensitive CMMs.

Such instructions will result in the recording of a stylus position only at times when the force applied to it is within the predefined range. Measurement will thus take place only when the correct force is exerted on the stylus. The force range at which position recording takes place may be adjustable. The circuitry described in U.S. Pat. No. 4,817,362 provides for adjustment in the trigger threshold point corresponding to force $F_1$, and well known techniques can be used to provide an adjustable point at which the trigger signal is switched off corresponding to force $F_2$ and greater forces.

It is desirable to have the ability to change the force at which the trigger signal is produced in order to be able to measure both deflectable and rigid workpieces. A deflectable workpiece will require a very low contact force with a low upper limit whereas a rigid component may be measured accurately with a large range of contact force.

This adjustability enhances the accuracy and usability of the probe.

The probes 10 of the two embodiments may be manually manipulated via a handgrip portion 14 on cover 22. After prolonged use, heat from an operator's hand is likely to affect the strain gauge readings, even though temperature compensation is provided by strain gauge 36R. To minimise the problems associated with thermal changes the strain gauge arrangement is insulated from the handgrip portion of the cover. Although the handgrip can transmit forces to the housing 22 it is not in thermally conductive contact with the housing at the region where the housing 22 and strain sensing member 34 are connected. The insulation is provided by an air gap 28.

The handgrip allows also an operator to impart forces into the probe at the connection between the handgrip and the housing, rather than pushing on parts of the housing that might distort the strain gauge readings. Thereby, the handgrip provides a protective shield against localised manually exerted forces on the strain sensing arrangement.

Figure 9:
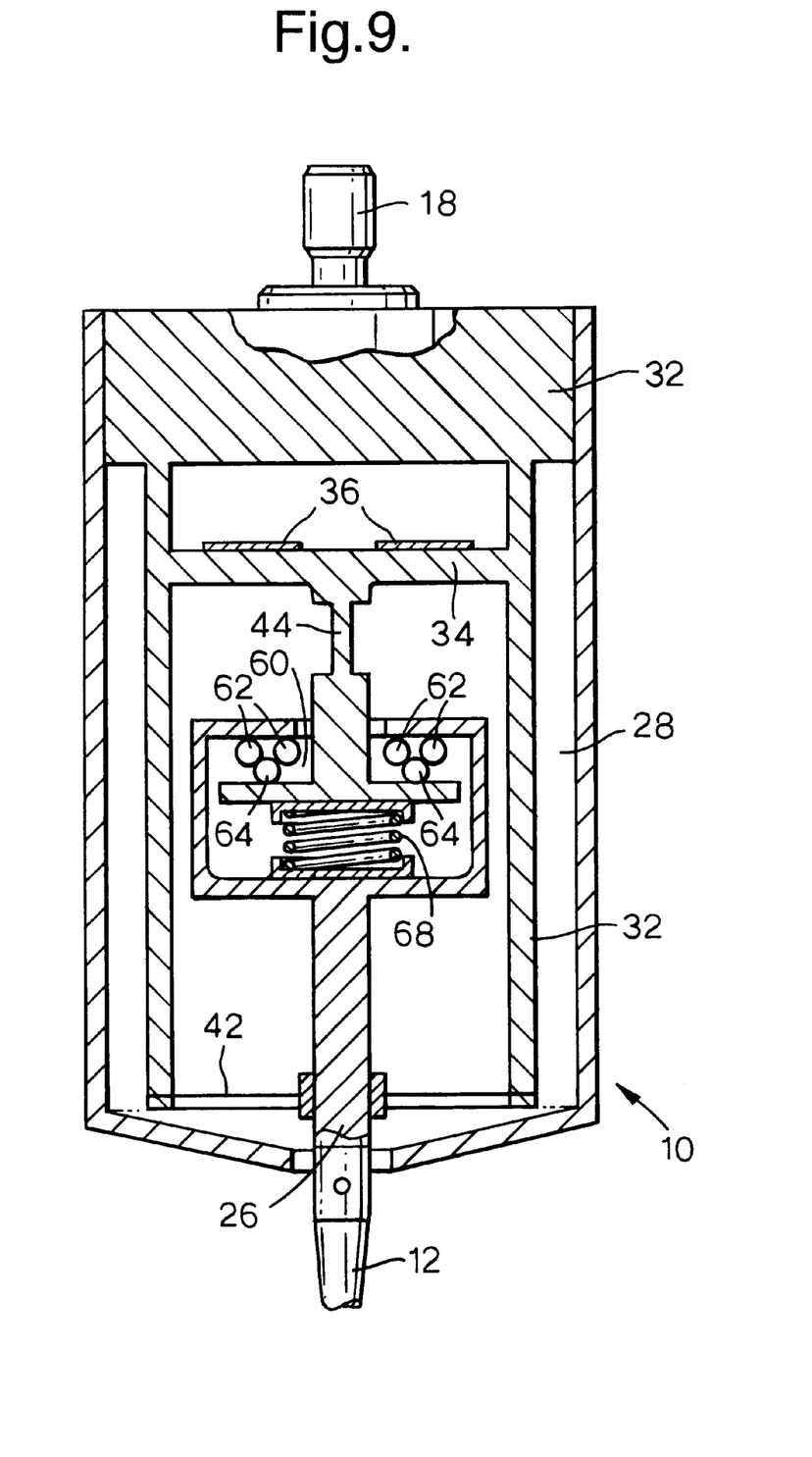
FIGS. 9 and 10 show two further embodiments of the invention.
Figure 10:
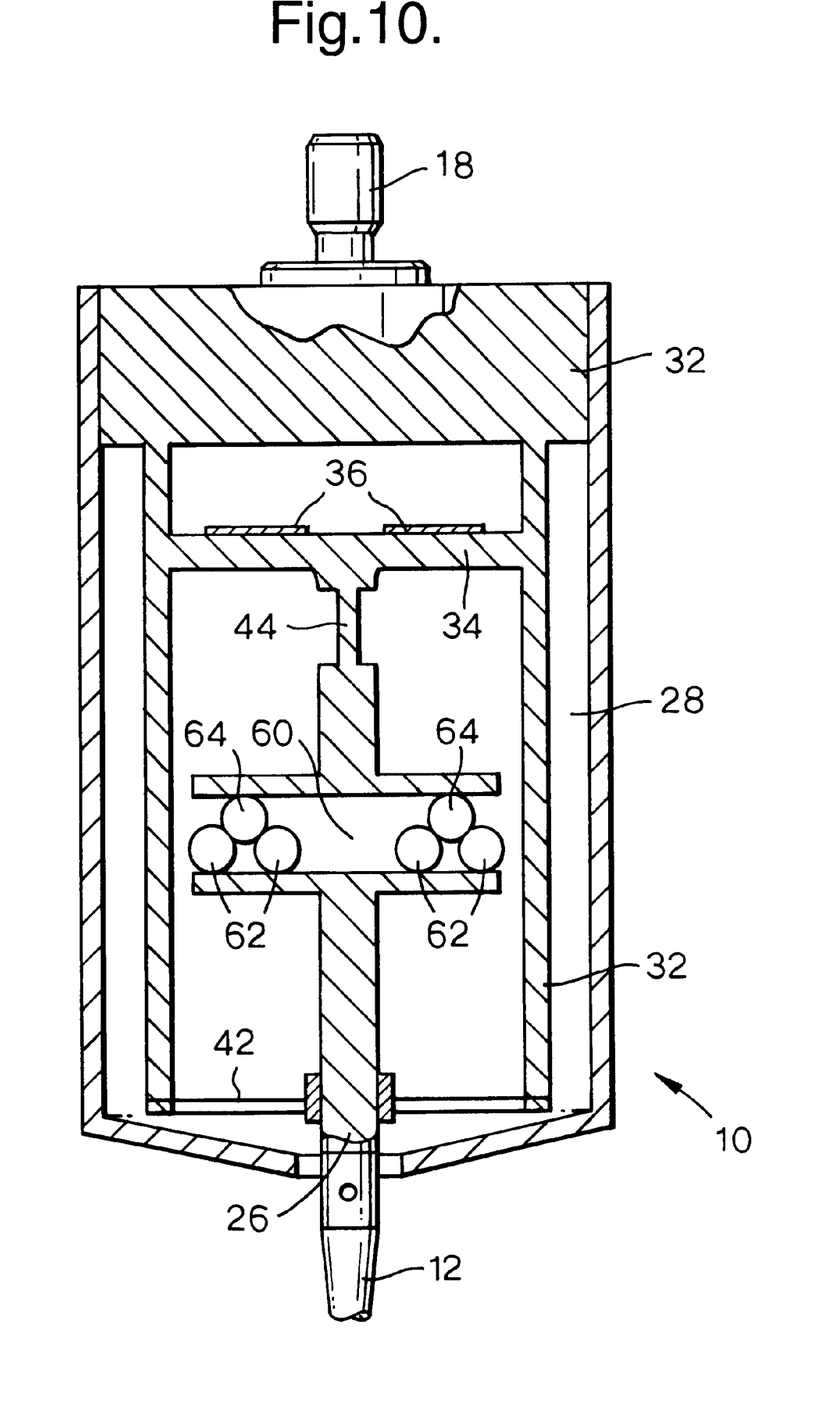

Two further embodiments are shown in FIGS. 9 and 10. These two embodiments have the features of the probes of the previously described embodiments, and common features have like reference numerals.

In addition to the common parts, FIGS. 9 and 10 each show a kinematic switch at 60, which can act to break a normally closed contact when force is exerted at the stylus 12. FIG. 9 shows a section through a variant probe 10. In the embodiment of FIG. 9 the switch 60 is formed at the stylus holder 26 between the member 34 and the diaphragm 42. The switch is formed by three pairs of balls 62, each pair being spaced at 120° to a central axis of the probe 10 (for clarity two pairs are shown at 180° in the Figure). A frame 66 holds these balls in place and is attached to the stylus holder 26. A further three balls 64 each form an electrical contact with one of the pairs of balls 62. A spring 68 pushes the balls 62,64 together to form a normally closed electrical contact therebetween.

Now, when force is applied to the stylus 12 in any of the X,Y or Z directions identified in FIGS. 2 and 3, then this force will cause the switch 60 to unseat when the force reaches a predetermined magnitude. Unseating of the switch 60 can be used to signal that a contact force value has been reached.

This signal can be used to indicate that either the lower or upper limit of contact force has been obtained. There will of course be a parallel signal from the strain sensing elements 36 on the member 34 and the two signals can be combined at an AND gate so that the presence of both signals provides either a "take a reading" signal or a "stop taking a reading" signal.

FIG. 10 shows a similar probe to the one shown in FIG. 9. A cross-section is shown. Sets of balls 64 and 62 are again shown at 180° but would in practice be spaced at 120°. Force exerted on the stylus in the X or Y direction will cause bending of the stylus holder at the switch and thereby cause unseating of the balls 62,64. The normally closed position of the switch is held by the resilience of the diaphragm 42. Again the open switch signal can be used as described above.

The foregoing description and drawings are intended to be illustrative only of one embodiment of the invention and various modifications will be apparent to the skilled addressee.

What is claimed is:

1. A measurement probe, comprising:
   a central axis;
   a stylus holder;
   a probe body; and
   a force transmitting member connecting the holder to the body and extending radially of the central axis, the member having at least one strain sensing element associated therewith for measuring the strain exerted on the member, the probe further comprising a diaphragm in spaced parallel relationship with the member, further connecting the holder to the body.

2. A measurement probe as claimed in claim 1 wherein the holder has a portion of reduced stiffness at or adjacent the member.

3. A measurement probe as claimed in claim 1 wherein the diaphragm is planar.

4. A measurement probe as claimed in claim 1 wherein the member has three strain sensing elements arranged at 120° intervals about a central region of the member.

5. A measurement probe as claimed in claim 4 wherein the intervals are formed by three spokes.

6. A measurement probe as claimed in claim 4 wherein a fourth reference element is provided mounted to a part of the member which is unstrained in use.

7. A probe as claimed in claim 1 wherein the member has six strain sensing elements.

8. A measurement probe as claimed in claim 7 wherein the six elements are arranged as two sets of three elements, each element of each set being positioned about a central region of the member and being separated by an interval of approximately 120° from the next element of the set.

9. A measurement probe as claimed in claim 8 wherein the member comprises three spokes extending radially from the central region and one element of a said set of elements is positioned on each spoke.

10. A measurement probe as claimed in claim 1 wherein there is further provided, at the stylus holder, a stylus contact force sensing arrangement in use having a first state for allowing coordinate determination and a second state for preventing coordinate determination, wherein the first state occurs when contact force on the stylus is within a force range having an upper and lower limit and the second state occurs when contact force on the stylus is outside the force range.

11. A measurement probe as claimed in claim 1 wherein an electrical switch is provided between the member and the diaphragm operative when the stylus holder is strained.

12. A measurement probe, comprising:
  a force sensing member;
  a housing surrounding the member; and
  a cover surrounding at least the portion of the housing that surrounds the member, the cover having a handgrip portion, the housing and the cover being separated.

13. A measurement probe as claimed in claim 12 wherein the separation is an air gap, providing thermal insulation and protection of the member from manual force influences.

14. A measurement probe as claimed in claim 12 wherein the handgrip portion comprises grooves in the cover and elastomeric rings disposed in the grooves.

15. A force sensing probe having a probe body and a workpiece contacting stylus, the probe being connected or connectable to a coordinate determination device, the probe in use sensing contact of the stylus with a workpiece with no significant deflection of the stylus relative to the probe body, the probe comprising a workpiece contact force sensing arrangement during operation having an output having a first state for allowing coordinate determination by the device, and a second state for preventing coordinate determination by the device, wherein the first state occurs when the contact force on the stylus is within a force range having an upper limit and the second state occurs when the contact force is above the upper limit.

16. A force sensing probe as claimed in claim 15 wherein the workpiece contact force sensing arrangement is disposed substantially within the probe.

17. A force sensing probe as claimed in claim 15, wherein the force range has a lower limit and the second state occurs also when the contact force is below the lower limit.

18. A force sensing probe as claimed in claim 17 wherein the upper and lower limits are independently selectively adjustable.

19. A force sensing probe as claimed in claim 15 wherein the occurrence of the first and/or second states is accompanied by an indication at the probe in the form of the illumination of a light or the operation of an audible device.

20. A force sensing probe as claimed in claim 19 wherein a different indication is given for each of the first and second states.

21. A force sensing probe as claimed in claim 15, wherein the workpiece contact force sensing arrangement includes at least one strain sensing element.

22. A force sensing probe as claimed in claim 15, wherein the workpiece contact force sensing arrangement is a piezoelectric device.

* * * * *